No. 9,926.  
J. PATTERSON.  
FRICTION ROLLER.  
PATENTED AUG. 9, 1853.
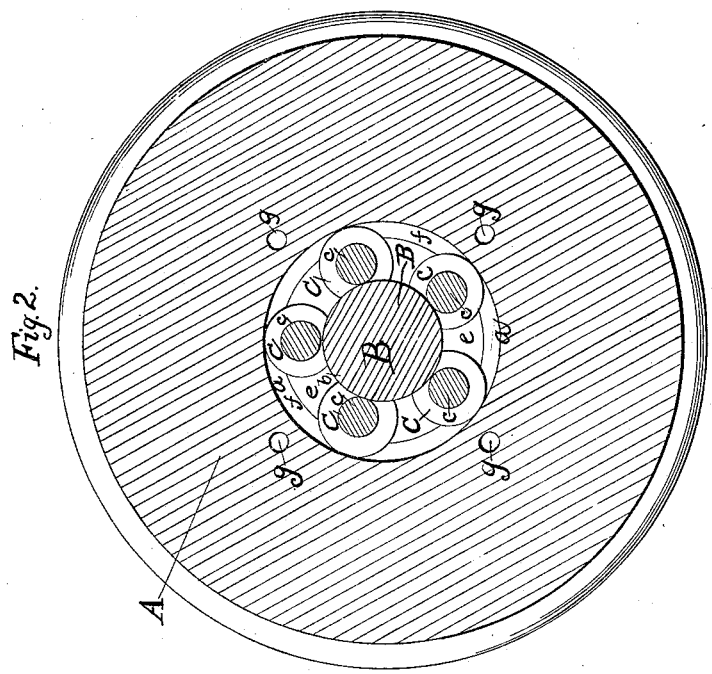
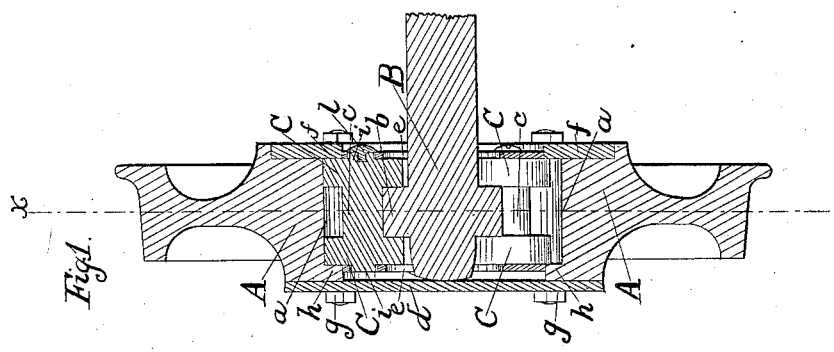

UNITED STATES PATENT OFFICE.

JAMES PATTERSON, OF FRANKLINVILLE, NEW YORK.

IMPROVEMENT IN FRICTION-ROLLERS.

Specification forming part of Letters Patent No. 9,926, dated August 9, 1853.

*To all whom it may concern:*

Be it known that I, JAMES PATTERSON, of Franklinville, in the county of Cattaraugus and State of New York, have invented a new and useful Improvement in the Bearings of Car Axles and Wheels; and I do hereby declare that the following is a full and exact description thereof, reference being had to the accompanying drawings, making part of this specification.

Figure 1 is a central section of a car wheel and axle, and Fig. 2 a section of the same in the line $x\,x$ of Fig. 1.

Like letters designate corresponding parts in both figures.

The nature of my invention consists in arranging within a central aperture of the car-wheel and around its axle a series of anti-friction rollers, each of which has bearing portions of different diameters, the larger C C of which roll upon the inner periphery $a$ of the car-wheel and the smaller $c$ upon an enlarged portion $b$ of the axle. Their proportions may be such that the inner circumference $a$ of the wheel shall bear the same ratio to that of the larger portions of each roller as the circumference of the enlarged portion $b$ of the axle bears to that of the smaller portion of each of the rollers.

The car-wheel A is constructed with a cylindrical aperture in its center of sufficient diameter to receive both the axle and the anti-friction rollers, and may have a permanent shoulder $h$ at the outer end of said aperture to prevent the rollers from moving endwise, but should have a removable shoulder or plate $f$ at the inner end of the aperture, whereby to insert said rollers and then to secure them within the aperture. A plate $d$ fits over and closes the outer end of the aperture for the purpose of excluding dust therefrom and for the axle B to bear against slightly to prevent any rubbing friction of the ends of the rollers against the shoulder $h$ by the inward pressure of the rails against the wheel or its flange. Said plates $d\,f$ are secured to the wheel by bolts $g\,g$, &c., passing through all and fastened by nuts.

The axle B does not revolve, but is permanently attached to the car-truck. Within the aperture of the car-wheel, midway and about one-half the distance between the two shoulders $d\,f$, (at $b$, Fig. 1,) it is enlarged to such a diameter that the required size and proportion may be given to the rollers between it and the periphery $a$ of the wheel's aperture.

The anti-friction rollers are made of the same length as the cylindrical aperture of the car-wheel, between the shoulders $d$ and $f$, and as many in number as can be inserted without coming in contact with one another. The portion $c$ of each roller, which comes in contact with the periphery $b$ of the axle is of less diameter than the portions C C at each end thereof, which come in contact with the inner periphery $a$ of the car-wheel. The large portions of the rollers should not come in contact with the small portions of the axle.

In order to keep the rollers at the proper relative distance apart, I form upon the ends of each roller small journals $i\,i$, which fit loosely into equidistant bearings in plates $e\,e$, Fig. 1, which revolve freely with said rollers. These plates may be kept in their positions upon said journals of the rollers by screws $l\,l$, which enter the ends of two or three of the journals, their heads preventing the plates from slipping off endwise. The friction on these journals is extremely slight, because they perform an office in practice which in theory would not be necessary.

By enlarging the diameter of that portion of the rollers which runs in contact with the wheel the liability of the latter to become indented by the rollers is greatly diminished, and thus one of the great difficulties in the way of using friction-rollers is avoided. Moreover the rolling of the wheel upon the axle is rendered much more certain, and the tendency to slip greatly diminished by the comparative smallness of that part of the roll which bears upon the axle, and whose turning is controlled by the larger portion, which bears upon the wheel. The enlargement of the axle at the surface of contact with the rolls prevents it from wearing so rapidly, and this, in connection with the increased certainty of the roller turning, which the large diameter of the part bearing on the wheel insures, gives a degree of durability and smoothness of motion hitherto unattained in wheels whose bearings are fitted with friction-rollers.

What I claim as my invention, and desire to secure by Letters Patent, is—

Fitting the bearing of a rolling car-wheel on a fixed axle, with a series of friction-rollers having bearings of large diameter to run in contact with the wheel and of smaller diameter to run in contact with the axle, the latter being enlarged at the point of contact with the rollers, as herein specified.

JAMES PATTERSON.

Witnesses:
Z. C. ROBBINS,
GEORGE A. C. SMITH.